United States Patent
Nagata et al.

(10) Patent No.: US 10,312,982 B2
(45) Date of Patent: Jun. 4, 2019

(54) BASE STATION, MOBILE STATION AND RADIO COMMUNICATION METHOD

(71) Applicant: NTT DOCOMO, INC., Tokyo (JP)

(72) Inventors: Satoshi Nagata, Tokyo (JP); Chongning Na, Beijing (CN); Huiling Jiang, Beijing (CN); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/768,070

(22) PCT Filed: Oct. 18, 2016

(86) PCT No.: PCT/JP2016/080803
§ 371 (c)(1),
(2) Date: Apr. 13, 2018

(87) PCT Pub. No.: WO2017/069110
PCT Pub. Date: Apr. 27, 2017

(65) Prior Publication Data
US 2018/0309484 A1     Oct. 25, 2018

(30) Foreign Application Priority Data
Oct. 18, 2015   (CN) .......................... 2015 1 0673152

(51) Int. Cl.
*H04B 7/02*     (2018.01)
*H04B 7/0456*   (2017.01)
*H04B 7/06*     (2006.01)

(52) U.S. Cl.
CPC ......... *H04B 7/0456* (2013.01); *H04B 7/0478* (2013.01); *H04B 7/0617* (2013.01)

(58) Field of Classification Search
CPC ... H04B 7/0456; H04B 7/0478; H04B 7/0617
See application file for complete search history.

(56) References Cited

U.S. PATENT DOCUMENTS

| | | | |
|---|---|---|---|
| 8,761,086 B2 | 6/2014 | Gorokhov et al. | |
| 2013/0229309 A1* | 9/2013 | Thomas | H04B 7/0478 342/377 |
| 2016/0373175 A1* | 12/2016 | Harrison | H04B 7/0469 |
| 2018/0167115 A1* | 6/2018 | Zhu | H04B 7/0478 |
| 2018/0212662 A1* | 7/2018 | Ren | H04B 7/06 |

FOREIGN PATENT DOCUMENTS

JP     2015-092682 A     5/2015

OTHER PUBLICATIONS

International Search Report issued in PCT/JP2016/080803 dated Dec. 20, 2016 (1 page).
Written Opinion issued in PCT/JP2016/080803 dated Dec. 20, 2016 (4 pages).

* cited by examiner

*Primary Examiner* — Dac V Ha
(74) *Attorney, Agent, or Firm* — Osha Liang LLP

(57) ABSTRACT

To generate a configuration entry in a master codebook. A base station according to one aspect of the present invention includes a codebook generating unit that determines a codebook subset corresponding to a predetermined configuration entry from a plurality of configuration entries in a master codebook, and a transmitter that transmits information of the predetermined configuration entry.

4 Claims, 4 Drawing Sheets

BASE STATION, MOBILE STATION AND RADIO COMMUNICATION METHOD

TECHNICAL FIELD

The present invention relates to a Multiple Input Multiple Output (MIMO) technique, and especially, is applied to a case that transmits a data signal to a receiving side in multiple data stream to relate to a base station, a mobile station, and a radio communication method.

BACKGROUND ART

In a current radio communication system such as a Long Term Evolution (LTE), a precoding matrix codebook is preliminarily stored in a radio base station and a mobile station, and then, a codeword used such that the mobile station communicates with the radio base station is selected from the preliminarily stored codebook, in accordance with, for example, a channel state of the mobile station. In order to fast and efficiently select the codeword used such that the mobile station communicates with the radio base station, from the preliminarily stored codebook, in a future radio communication system such as a LTE-Advanced (LTE-A) subsequent to the LTE, the following method has already been proposed; the method first elementary selects the codewords included in the codebook, and then, further selects the codeword that the mobile station uses from the elementarily selected codewords.

Considering application to various applied situations, the precoding matrix master codebook and different setting of the master codebook may be used to generate different codebooks for different applied situations. Specifically, the master codebook is preliminarily stored in the radio base station and the mobile station. The radio base station may determine a configuration-entry codebook that the radio base station and the mobile station can use during actual data transmission, via a configuration entry corresponding to an actual situation. The codeword in this configuration-entry codebook may be a subset of the codewords in the master codebook. The radio base station transmits information of the configuration entry to the mobile station such that the mobile station precisely generates the configuration-entry codebook. In this description, terms such as "a configuration entry," "a configuration item," "a configuration," and "configured" can be interchangeably used.

SUMMARY OF INVENTION

Technical Problem

In conventional 3rd Generation Partnership Project (3GPP) standards, configuration aspects of a preceding matrix master codebook for single data stream and its configuration entry have already been proposed. On the other hand, in order to improve system capacity and throughput, it is proposed that radio communication is performed using a plurality of independent data streams between the radio base station and the mobile station. Accordingly, when performing the radio communication using a multiple data stream, a method that generates the configuration entry of the master codebook is necessary.

Solution to Problem

A base station according to one aspect of the present invention includes a codebook generating unit that determines a codebook subset corresponding to a predetermined configuration entry from a plurality of configuration entries in a master codebook, and a transmitter that transmits information of the predetermined configuration entry.

One aspect of the present invention provides a method that generates the configuration entry of the master codebook. The method includes a step of determining a configured beam pattern corresponding to each of a plurality of configuration entries in the master codebook in a case of a multiple-data-stream transmission, a beam pattern in the configured beam patterns indicating a beam available for a mobile station in the master codebook, each of the configured beam patterns including a plurality of independent data-stream beam patterns, and for each of the configuration entries, the plurality of independent data-stream beam patterns corresponding to this configuration entry being similar, a step of synthesizing beams indicated by the plurality of independent data-stream beam patterns corresponding to each of the configuration entries to form a plurality of multiple-data-stream beam entries for this configuration entry, and a step of determining a part of multiple-data-stream beam entries that fulfill a predetermined condition from the plurality of multiple-data-stream beam entries formed for each of the configuration entries, as candidate multiple-data-stream beam entries to generate this configuration entry based on the determined candidate multiple-data-stream beam entries.

One aspect of the present invention provides an electronic device. The electronic device includes a pattern determining unit that determines a configured beam pattern corresponding to each of a plurality of configuration entries in the master codebook in a case of a multiple-data-stream transmission, a beam pattern in the configured beam patterns indicating a beam available for a mobile station in the master codebook, each of the configured beam patterns including a plurality of independent data-stream beam patterns, and for each of the configuration entries, the plurality of independent data-stream beam patterns corresponding to this configuration entry being similar, a beam synthesizing unit that synthesizes beams indicated by the plurality of independent data-stream beam patterns corresponding to each of the configuration entries to form a plurality of multiple-data-stream beam entries for this configuration entry, and a configuration entry generating unit that determines a part of multiple-data-stream beam entries that fulfill a predetermined condition from the plurality of multiple-data-stream beam entries formed for each of the configuration entries, as candidate multiple-data-stream beam entries to generate this configuration entry based on the determined candidate multiple-data-stream beam entries.

Advantageous Effects of Invention

The above-described aspects of the present invention provide a base station, a mobile station, and a radio communication method when performing a radio communication in multiple data stream. A working example of the present invention forms a configuration entry in the master codebook using fewer beams to simplify a subsequent operation required for the mobile station.

BRIEF DESCRIPTION OF DRAWINGS

An embodiment of the present invention will be described in detail by referring to the drawings. Thus, the above-described and other purposes, features, and advantages of the present invention will be become more apparent.

DESCRIPTION OF EMBODIMENTS

Figure 1:
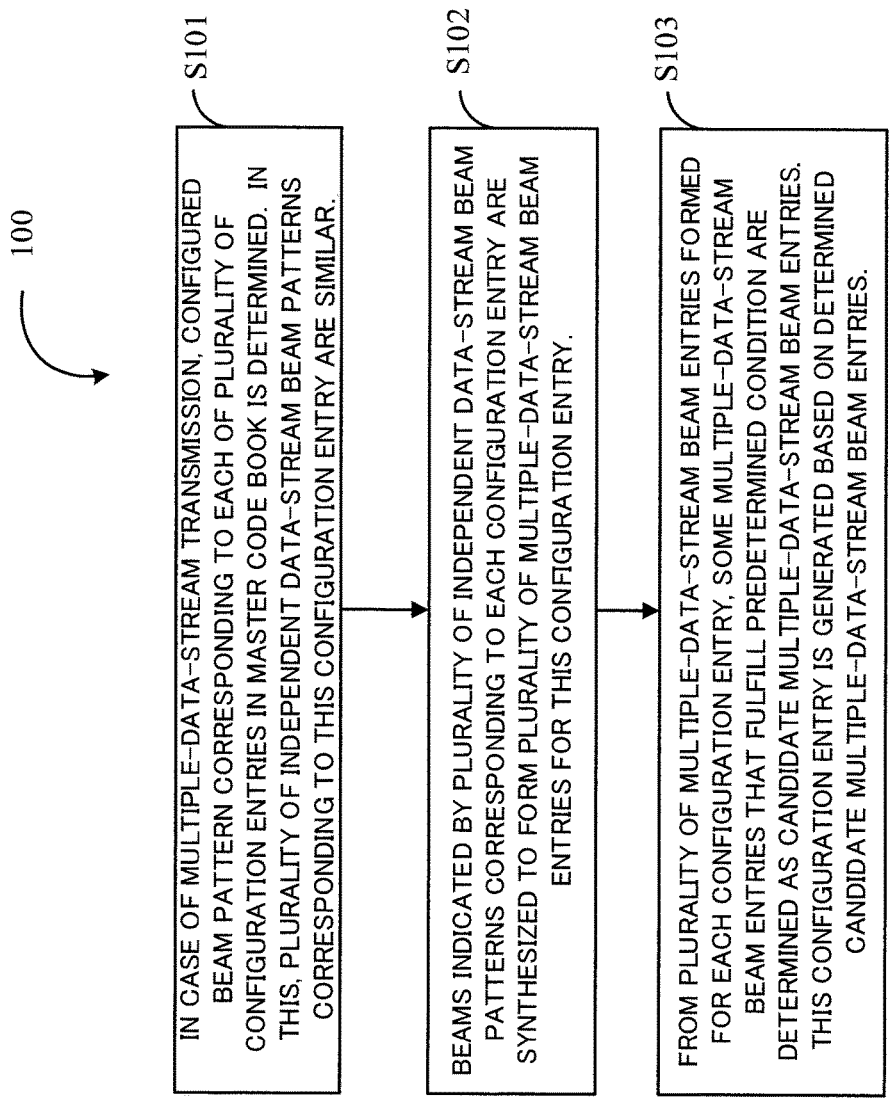
FIG. 1 is a flowchart illustrating a method that generates a configuration entry in a master codebook according to an embodiment of the present invention.

The following describes an embodiment of the present invention by referring to the drawings. In the following, providing description by referring to the drawings helps to understand an exemplary embodiment of the present invention, which is limited by the claims and their equivalents. However, they should be considered only as an example. Accordingly, it will be appreciated for those skilled in the art in this technical field that various changes or modifications are possible for the embodiment described here without departing from the range and the thought of the present invention. In order to make the description tidier and briefer, the versed function and configuration in this technical field will not be further elaborated here.

For ease of understanding, technical terms mentioned in the following description will be described. In any of a transmitting side and a receiving side according to the embodiment of the present invention, a master codebook is preliminarily stored. The master codebook includes a plurality of codewords. In the embodiment of the present invention, each configuration entry includes a configuration-entry codebook corresponding to this configuration entry. Each configuration-entry codebook is a subset of the master codebook. Specifically, the codewords in the master codebook are divided into some codeword sets with a predetermined rule, and the configuration-entry codebook corresponding to each configuration entry may be constituted of some codewords selected from each codeword set.

For example, the master codebook includes 8192 codewords. These 8192 codewords are first divided into 256 codeword sets. Each codeword set among them includes 32 codewords. The configuration-entry codebook for a configuration entry A includes two codewords in each codeword set, and in total, includes 512 codewords in the master codebook. The configuration-entry codebook for a configuration entry B includes 16 codewords in each codeword set, and in total, includes 4096 codewords in the master codebook. The configuration-entry codebook for a configuration entry C includes 16 codewords in each codeword set, and in total, includes 4096 codewords in the master codebook. The configuration-entry codebook for a configuration entry D includes 16 codewords in each codeword set, and in total, includes 4096 codewords in the master codebook.

The codeword included in the configuration-entry codebook corresponding to each configuration entry can be expressed in a beam that a mobile station can use to communicate with a radio base station. For example, when a data signal is transmitted in two data streams, a beam available for a first data stream and a beam available for a second data stream indicate each codeword in the codebook corresponding to the configuration entry. The codeword set in the above-described master codebook can be expressed in a beam (hereinafter referred to as a "master beam set") included in the codeword set in the above-described master codebook. For example, when the data signal is transmitted in the two data streams, the beam available for the first data stream and the beam available for the second data stream indicate each codeword in the master codebook.

The following describes a method that generates the configuration entry in the master codebook according to the embodiment of the present invention by referring to FIG. 1. FIG. 1 is a flowchart illustrating a method 100 that generates the configuration entry in the master codebook according to the embodiment of the present invention.

At Step S101, in a case of a multiple-data-stream transmission, a configured beam pattern corresponding to each of the plurality of configuration entries in the master codebook. Here, in the case of the multiple-data-stream transmission, the configured beam pattern corresponding to each configuration entry includes a plurality of independent data-stream beam patterns. The count of the independent data-stream beam patterns is identical to the count of the transmission data streams.

For example, when the data signal is transmitted in the two data streams, the configured beam pattern corresponding to each configuration entry includes two independent data-stream beam patterns (a first data-stream beam pattern and a second data-stream beam pattern).

In the embodiment of the present invention, for each configuration entry, the plurality of independent data-stream beam patterns corresponding to this configuration entry are similar. For example, for the master codebook, for example, four configuration entries (the configuration entry A, the configuration entry B, the configuration entry C, and the configuration entry D) can be disposed. In the embodiment of the present invention, the count of the configuration entries may be another count. For the configuration entry A, the first data-stream beam pattern and the second data-stream beam pattern are similar. For the configuration entry B, the first data-stream beam pattern and the second data-stream beam pattern are similar. Also for the configuration entry C and the configuration entry D, similarly, the first data-stream beam pattern and the second data-stream beam pattern are similar.

The beam pattern indicates the beam that the mobile station can use in the master beam set. In other words, the configured beam pattern corresponding to each configuration entry indicates the beam that the mobile station can use in the master beam set, in this configuration entry. Each configured beam pattern may include the independent data-stream beam patterns whose count is equal to the count of the data streams for communicating between the radio base station and the mobile station. Each independent data-stream beam pattern indicates the beam available in the master beam set. For example, the first data-stream beam pattern indicates the beam that the mobile station can use in the first data stream, and the second data-stream beam pattern indicates the beam the mobile station can use in the second data stream.

Figure 2:
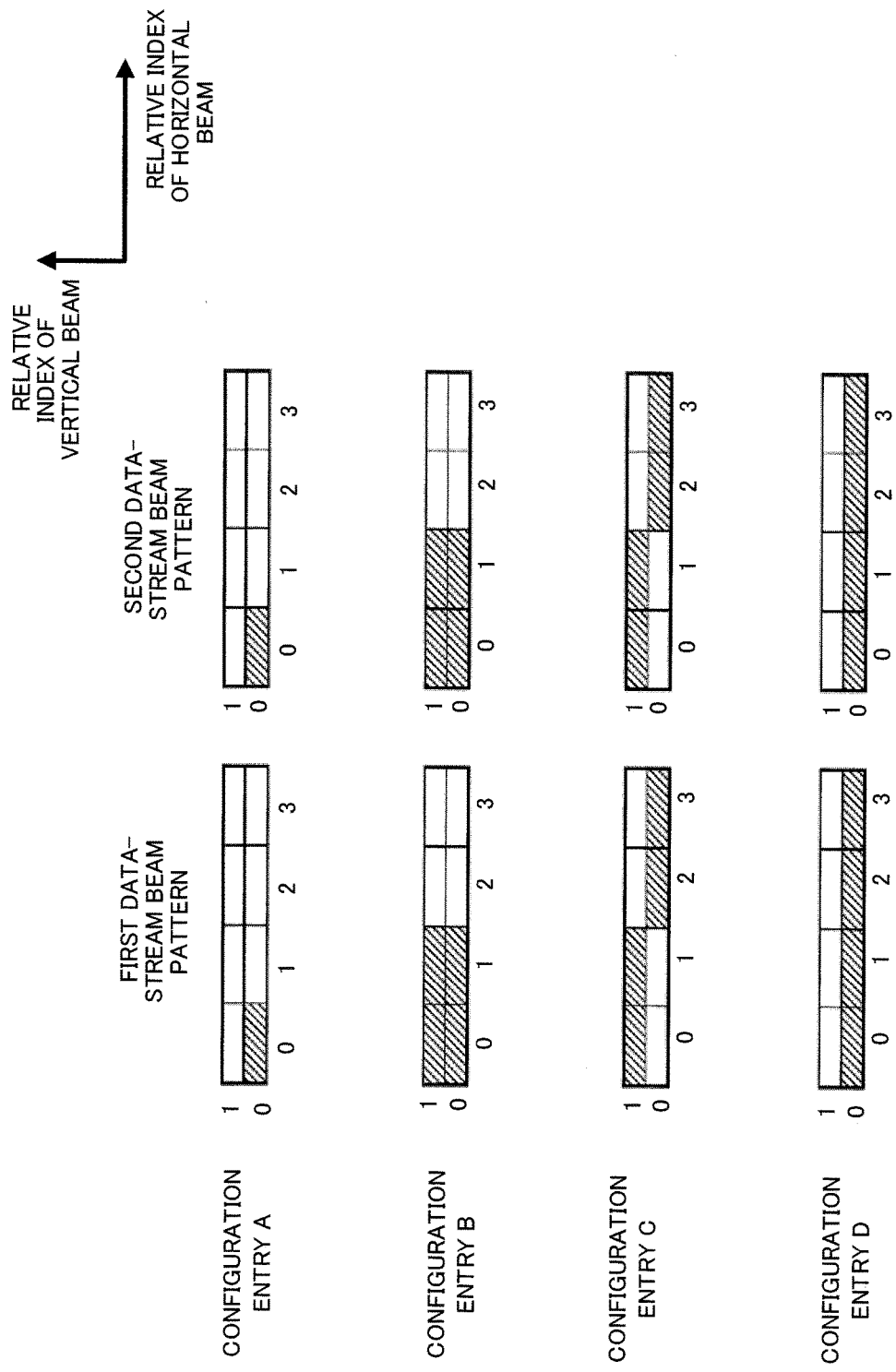
FIG. 2 is an explanatory drawing illustrating a state of an exemplary configured beam pattern of the present invention.
Figure 3:
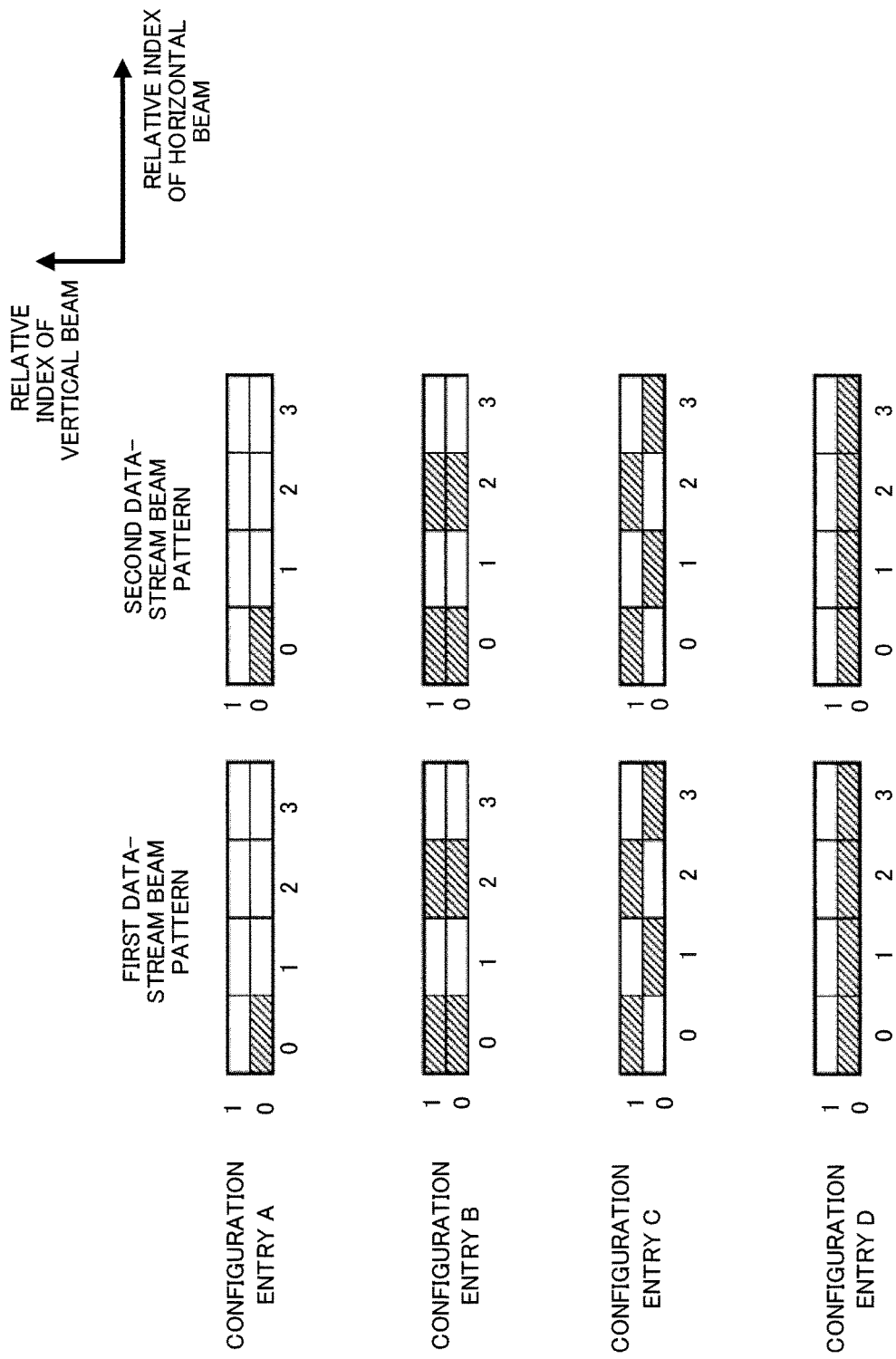
FIG. 3 is an explanatory drawing illustrating a state of another exemplary configured beam pattern of the present invention.

FIG. 2 is an explanatory view illustrating a state of an exemplary configured beam pattern of the present invention. FIG. 3 is an explanatory view illustrating a state of another exemplary configured beam pattern of the present invention. In the examples illustrated in FIG. 2 and FIG. 3, it is assumed that transmission is performed between the radio base station and the mobile station using two independent data streams. As illustrated in FIG. 2 and FIG. 3, in these examples, the master beam set including a plurality of beams that the radio base station can transmit is a master beam set indicated in a 4×2 grid. Each grid in the master beam set represents one beam. Each independent data-stream beam pattern indicates the beam (denoted by a grid filling up with diagonal lines in FIG. 2 and FIG. 3) that the mobile station can use. The examples illustrated in FIG. 2 and FIG. 3 describe a case where the beam in a first direction included in the master beam set is the beam in a horizontal direction, and the beam in a second direction is the beam in a vertical direction, as an example. However, a working example of the present invention is not limited to this. The master beam set may be constituted of beams in other directions.

As illustrated in FIG. 2 and FIG. 3, two independent data-stream beam patterns, that is, the first data-stream beam pattern and the second data-stream beam pattern are corresponding to each configuration entry in the configuration entries A to D. The first data-stream beam pattern and the second data-stream pattern corresponding to an identical configuration entry are similar.

In the following description, (x1, y1) represents the beam available in the first data stream. Here, x1 represents a relative index in the first direction of the first data-stream beam, and y1 represents a relative index in the second direction of the first data-stream beam. In the description with reference to FIG. 2 and FIG. 3, x1 represents the relative index in the master beam set, of a horizontal beam of the first data stream, and y1 represents the relative index in the master beam set, of a vertical beam of the first data stream. Obviously, in the embodiment of the present invention, an order of the relative index of the horizontal beam and the relative index of the vertical beam may be adjusted. For example, x1 may represent the relative index in the master beam set, of the vertical beam of the first data stream, and y1 may represent the relative index in the master beam set, of the horizontal beam of the first data stream.

Similarly, (x2, y2) represents the beam available in the second data stream. Here, x2 represents a relative index in the first direction of the second data-stream beam, and y2 represents a relative index in the second direction of the second data-stream beam. In the description with reference to FIG. 2 and FIG. 3, x2 represents the relative index in the master beam set, of a horizontal beam of the second data stream, and y2 represents the relative index in the master beam set, of a vertical beam of the second data stream. Obviously, x2 may represent the relative index in the master beam set, of the vertical beam of the second data stream, and y2 may represent the relative index in the master beam set, of the horizontal beam of the second data stream.

Specifically, as illustrated in FIG. 2, for the configuration entry A, the first data-stream beam pattern indicates that the beam available in the first data stream is (x1=0, y1=0), and the beam available in the second data stream indicated by the second data-stream beam pattern is similar to that of the first data-stream beam pattern. Specifically, as described below, in a specific codeword set, the relative index of the codeword and an absolute index of the codeword are corresponding one by one. Accordingly, based on a parameter for identifying the codeword set, and the relative index in the codeword set of this codeword, the absolute index of the codeword can be identified. For the configuration entry B, the first data-stream beam pattern indicates that the beams available in the first data stream are (0, 0), (1, 0), (0, 1), and (1, 1), and the available beams indicated by the second data-stream beam pattern are similar to the available beams indicated by the first data-stream beam pattern. For the configuration entry C, the first data-stream beam pattern indicates that the beams available in the first data stream are (0, 1), (1, 1), (2, 0), and (3, 0), and the available beams indicated by the second data-stream beam pattern are similar to the available beams indicated by the first data-stream beam pattern. For the configuration entry D, the first data-stream beam pattern indicates that the beams available in the first data stream are (0, 0), (1, 0), (2, 0), and (3, 0), and the available beams indicated by the second data-stream beam pattern are similar to the available beams indicated by the first data-stream beam pattern.

Similarly, as illustrated in FIG. 3, for each configuration entry, the first data-stream beam pattern is corresponding to the second data-stream beam pattern. The first data-stream beam pattern and the second data-stream beam pattern corresponding to an identical configuration entry are similar. In FIG. 3, grids indicated in the diagonal lines indicate the beams that the mobile station can use in this data stream.

Specifically, as illustrated in FIG. 3, for the configuration entry A, the first data-stream beam pattern indicates that the beam available in the first data stream is (x1=0, y1=0), and the available beam indicated by the second data-stream beam pattern is similar to the available beam indicated by the first data-stream beam pattern. For the configuration entry B, the first data-stream beam pattern indicates that the beams available in the first data stream are (0, 0), (2, 0), (0, 1), and (2, 1), and the available beams indicated by the second data-stream beam pattern are similar to the available beams indicated by the first data-stream beam pattern. For the configuration entry C, the first data-stream beam pattern indicates that the beams available in the first data stream are (0, 1), (1, 0), (2, 1), and (3, 0), and the available beams indicated by the second data-stream beam pattern are similar to the available beams indicated by the first data-stream beam pattern. For the configuration entry D, the first data-stream beam pattern indicates that the beams available in the first data stream are (0, 0), (1, 0), (2, 0), and (3, 0), and the available beams indicated by the second data-stream beam pattern are similar to the available beams indicated by the first data-stream beam pattern.

In the embodiment of the present invention, a plurality of configuration entries may include the first configuration entry and a plurality of second configuration entries other than the first configuration entry. The beam indicated by the independent data-stream beam pattern corresponding to the first configuration entry may include the beam that does not overlap the beams indicated by the independent data-stream beam patterns of the different second configuration entries. According to one example of the present invention, the count of the beam indicated by the independent data-stream beam pattern corresponding to each second configuration entry is identical to the count of the beam indicated by the independent data-stream beam pattern corresponding to the first configuration entry.

For example, in the configured beam pattern illustrated in FIG. 2, the beams indicated by the independent data-stream beam pattern corresponding to the configuration entry C include the beams that do not overlap the beams indicated by the independent data-stream beam patterns of the different second configuration entries (the configuration entry B and the configuration entry D). In this configured beam pattern, the count of the beams indicated by the independent data-stream beam pattern corresponding to the configuration entry C is identical to that of the beams indicated by the independent data-stream beam pattern corresponding to each of the configuration entries B and D.

As illustrated in FIG. 2, the beams that overlap one another among the beams indicated by the independent data-stream beam patterns of the configuration entries B and D are (0, 0) and (1, 0). The beams indicated by the independent data-stream beam pattern corresponding to the configuration entry C are (0, 1), (1, 1), (2, 0), and (3, 0), thus, do not include these overlapped beams (0, 0) and (1, 0).

Similar to FIG. 2, FIG. 3 also illustrates configured beam patterns of four configuration entries (that is, the configuration entry A, the configuration entry B, the configuration entry C, and the configuration entry D). Here, for the configuration entry C, the beams indicated by the independent data-stream beam pattern corresponding to the configuration entry C include the beams that do not overlap the beams indicated by the independent data-stream beam patterns of the different second configuration entries (the configuration entry B and the configuration entry D). In this configured beam patterns, the count of the beams indicated by the independent data-stream beam pattern corresponding to the configuration entry C is identical to that of the beams indicated by the independent data-stream beam pattern corresponding to each of the configuration entries B and D. For example, the beams that overlap one another among the beams indicated by the independent data-stream beam patterns of the different second configuration entries (the configuration entries B and the configuration entry D) are (0, 0) and (2, 0). The beams indicated by the independent data-stream beam pattern corresponding to the configuration entry C are (0, 1), (1, 0), (2, 1), and (3, 0), thus, do not include these overlapped beams (0, 0) and (2, 0).

In the embodiment of the present invention, the beams indicated by the independent data-stream beam pattern of the first configuration entry may not be adjacent in the first direction and/or the second direction.

For example, in the configured beam pattern illustrated in FIG. 3, the independent data-stream beam pattern for the configuration entry C indicates the beams (0, 1), (1, 0), (2, 1), and (3, 0). In the indicated four beams, the beams whose relative index of the horizontal beam are identical do not exist. That is, the beams indicated by the independent data-stream beam pattern for the configuration entry C are not adjacent in the vertical direction. According to the grids filling up with the diagonal lines illustrated in FIG. 3 (representing the beams that the mobile station can use in this data stream), the grids filling up with the diagonal lines are not adjacent to one another even in the horizontal direction.

Referring again to FIG. 1, at Step S102, the beams indicated by the plurality of independent data-stream beam patterns corresponding to each configuration entry are synthesized to form a plurality of multiple-data-stream beam entries for this configuration entry. Specifically, when generating the plurality of data-stream beam entries for the configuration entry, each one beam is selected from the beams indicated by the plurality of independent data-stream beam patterns corresponding to this configuration entry. The respective selected beams are synthesized to constitute the multiple-data-stream beam entry for this configuration entry.

For example, in the case of the configured beam pattern illustrated in FIG. 2, for the configuration entry A, one beam (x1=0, y1=0) is selected from the beams indicated by the first data-stream beam pattern, and one beam (x2=0, y2=0) is selected from the beams indicated by the second data-stream beam pattern. Accordingly, a multiple-data-stream beam entry (x1=0, y1=0, x2=0, y2=0) for the configuration entry A is constituted. For the configuration entry B, for example, one beam (0, 0) is selected from the beams indicated by the first data-stream beam pattern, and one beam (0, 0) is selected from the beams indicated by the second data-stream beam pattern. Accordingly, a multiple-data-stream beam entry (0, 0, 0, 0) for the configuration entry B is constituted. For example, one beam (0, 0) is selected from the beams indicated by the first data-stream beam pattern, and one beam (1, 0) is selected from the beams indicated by the second data-stream beam pattern.

Accordingly, a multiple-data-stream beam entry (0, 0, 1, 0) for the configuration entry B is constituted. Thus, for the configuration entry B, four available beams are indicated in the first data-stream beam pattern, and four available beams are indicated in the second data-stream beam pattern. Accordingly, 16 (=4×4) multiple-data-stream beam entries for the configuration entry B can be constituted. Similarly, also for the configuration entry C and the configuration entry D, 16 (=4×4) multiple-data-stream beam entries each for the configuration entry C and the configuration entry D can be constituted. For example, the multiple-data-stream beam entries that can be constituted for the configuration entry C are (0, 1, 0, 1), (0, 1, 1, 1), (0, 1, 2, 0), (0, 1, 3, 0), (1, 1, 0, 1), (1, 1, 1, 1), (1, 1, 2, 0), (1, 1, 3, 0), (2, 0, 0, 1), (2, 0, 1, 1), (2, 0, 2, 0), (2, 0, 3, 0), (3, 0, 0, 1), (3, 0, 1, 1), (3, 0, 2, 0), and (3, 0, 3, 0).

As described above, when representing the available beams of the first data stream, the order of the relative index of the horizontal beam and the relative index of the vertical beam can be adjusted. Also when representing the available beams of the second data stream, the order of the relative index of the horizontal beam and the relative index of the vertical beam can be adjusted. When representing the multiple-data-stream beam entry, the order of the relative indexes of the respective data streams also can be adjusted. For example, after representing the relative index of the horizontal beam and the relative index of the vertical beam of the second data stream in first, the relative index of the horizontal beam and the relative index of the vertical beam of the first data stream may be represented. Further, for example, after representing the relative indexes of the horizontal beams of the first data stream and the second data stream in first, the relative indexes of the vertical beams of the first data stream and the second data stream may be represented.

At Step S103, from the plurality of multiple-data-stream beam entries formed for each configuration entry, a part of multiple-data-stream beam entries that fulfill a predetermined condition are determined as candidate multiple-data-stream beam entries.

Specifically, when determining a part of multiple-data-stream beam entries from the plurality of multiple-data-stream beam entries formed for each configuration entry, the beam of the first data stream and the beam of the second data stream in a part of multiple-data-stream beam entries to be selected relate to one another. Accordingly, transmission efficiency can be improved. For example, in the multiple-data-stream beam entries that can be constituted for the configuration entry C, for the beam entry (0, 1, 2, 0), the beam of the first data stream is (0, 1), and the beam of the second data stream is (2, 0). The beam of the first data stream and the beam of the second data stream are poor in relevance. Thus, the beam entry (0, 1, 2, 0) is not selected as the candidate multiple-data-stream beam entry.

In the embodiment of the present invention, when determining a part of multiple-data-stream beam entries from the plurality of multiple-data-stream beam entries formed for each configuration entry, considering the candidate multiple-data-stream beam entries in other configuration entries, the candidate multiple-data-stream beam entries of the respective configuration entries may overlap one another.

Specifically, in the case of the configured beam pattern illustrated in FIG. 2, a part of multiple-data-stream beam entries (0, 1, 0, 1), (0, 1, 1, 1), (0, 1, 3, 0), (1, 1, 1, 1), (1, 1, 2, 0), (1, 1, 3, 0), (2, 0, 2, 0), and (3, 0, 3, 0) are selected for the configuration entry C. Accordingly, the selected eight multiple-data-stream beam entries will be the candidate multiple-data-stream beam entries.

In the embodiment of the present invention, in the master beam set, the count of the beams in the first direction may be identical to the count of the beams in the second direction in the candidate multiple-data-stream beam entries of the first configuration entry. For example, as described above, when selecting eight candidate multiple-data-stream beam entries from 16 multiple-data-stream beam entries in accordance with the predetermined condition, in the eight candidate multiple-data-stream beam entries, the count of the beams in the horizontal direction is identical to the count of the beams in the vertical direction.

It is to be noted that, the above-described method that selects the candidate multiple-data-stream beam entries from the plurality of multiple-data-stream beam entries, which is described using FIG. 2 and FIG. 3 is only one example of the present invention. The selection method according to the working example of the present invention is not limited to this. A different predetermined condition is disposed based on a specific situation, and in accordance with the disposed predetermined condition, the candidate multiple-data-stream beam entries are selected from the plurality of multiple-data-stream beam entries.

After determining the candidate multiple-data-stream beam entries, further, this configuration entry is generated based on the determined candidate multiple-data-stream beam entries at Step S103.

Specifically, after determining the candidate multiple-data-stream beam entries for each configuration entry, at least one index set for this configuration entry is generated based on all the candidate multiple-data-stream beam entries for this configuration entry.

For example, the candidate multiple-data-stream beam entries for this configuration entry may be the index set for this configuration entry. At the time, each index set for this configuration entry includes the relative index of the horizontal beam of the first data stream, the relative index of the vertical beam of the first data stream, the relative index of the horizontal beam of the second data stream, and the relative index of the vertical beam of the second data stream.

When generating the index set for this configuration entry based on the candidate multiple-data-stream beam entries for this configuration entry, an index "n" that represents a polarization-direction beam may be added. For example, when values that the added index of the polarization-direction beam take two possible values, for the configuration entry C of the configured beam pattern illustrated in FIG. 2, based on the determined eight candidate multiple-data-stream beam entries (0, 1, 0, 1), (0, 1, 1, 1), (0, 1, 3, 0), (1, 1, 1, 1), (1, 1, 2, 0), (1, 1, 3, 0), (2, 0, 2, 0), and (3, 0, 3, 0), 16 index sets: (x1=0, y1=1, x2=0, y2=1, n=0), (0, 1, 0, 1, 1), (0, 1, 1, 1, 0), (0, 1, 1, 1, 1), (0, 1, 3, 0, 0), (0, 1, 3, 0, 1), (1, 1, 1, 1, 0), (1, 1, 1, 1, 1), (1, 1, 2, 0, 0), (1, 1, 2, 0, 1), (1, 1, 3, 0, 0), (1, 1, 3, 0, 1), (2, 0, 2, 0, 0), (2, 0, 2, 0, 1), (3, 0, 3, 0, 0), and (3, 0, 3, 0, 1) for this configuration entry C are generated.

As described above, when representing the multiple-data-stream beam entries, the order of the relative indexes of the respective data streams can also be adjusted. The order of the index sets may also be arbitrarily adjusted. In the above-described representing method, after representing the relative indexes of the multiple-data-stream beam entries in first, the indexes of the polarization-direction beams are represented. However, the indexes of the polarization-direction beams may be represented in first.

Specifically, after determining the candidate multiple-data-stream beam entries for each configuration entry, at least one index set for this configuration entry is generated based on all the candidate multiple-data-stream beam entries for this configuration entry. Specifically, Table 1 indicates the index sets for the configuration entry A of the configured beam pattern illustrated in FIG. 2. Table 2 indicates the index sets for the configuration entry B of the configured beam pattern illustrated in FIG. 2. Table 3 indicates the index sets for the configuration entry C of the configured beam pattern illustrated in FIG. 2. Table 4 indicates the index sets for the configuration entry D of the configured beam pattern illustrated in FIG. 2.

TABLE 1

| | |
|---|---|
| 0, 0, 0, 0, 0 | 0, 0, 0, 0, 1 |

TABLE 2

| | | | |
|---|---|---|---|
| 0, 0, 0, 0, 0 | 0, 0, 0, 0, 1 | 1, 0, 1, 0, 0 | 1, 0, 1, 0, 1 |
| 0, 0, 1, 0, 0 | 0, 0, 1, 0, 1 | 1, 1, 1, 1, 0 | 1, 1, 1, 1, 1 |
| 0, 1, 0, 1, 0 | 0, 1, 0, 1, 1 | 0, 1, 1, 1, 0 | 0, 1, 1, 1, 1 |
| 0, 0, 0, 1, 0 | 0, 0, 0, 1, 1 | 1, 0, 1, 1, 0 | 1, 0, 1, 1, 1 |

TABLE 3

| | | | |
|---|---|---|---|
| 2, 0, 2, 0, 0 | 2, 0, 2, 0, 1 | 3, 0, 3, 0, 0 | 3, 0, 3, 0, 1 |
| 0, 1, 0, 1, 0 | 0, 1, 0, 1, 1 | 1, 1, 1, 1, 0 | 1, 1, 1, 1, 1 |
| 0, 1, 3, 0, 0 | 0, 1, 3, 0, 1 | 0, 1, 1, 1, 0 | 0, 1, 1, 1, 1 |
| 1, 1, 2, 0, 0 | 1, 1, 2, 0, 1 | 1, 1, 3, 0, 0 | 1, 1, 3, 0, 1 |

TABLE 4

| | | | |
|---|---|---|---|
| 0, 0, 0, 0, 0 | 0, 0, 0, 0, 1 | 1, 0, 1, 0, 0 | 1, 0, 1, 0, 1 |
| 2, 0, 2, 0, 0 | 2, 0, 2, 0, 1 | 3, 0, 3, 0, 0 | 3, 0, 3, 0, 1 |
| 0, 0, 1, 0, 0 | 0, 0, 1, 0, 1 | 1, 0, 2, 0, 0 | 1, 0, 2, 0, 1 |
| 0, 0, 3, 0, 0 | 0, 0, 3, 0, 1 | 1, 0, 3, 0, 0 | 1, 0, 3, 0, 1 |

Specifically, Table 5 indicates the index sets for the configuration entry A of the configured beam pattern illustrated in FIG. 3. Table 6 indicates the index sets for the configuration entry B of the configured beam pattern illustrated in FIG. 3. Table 7 indicates the index sets for the configuration entry C of the configured beam pattern illustrated in FIG. 3. Table 8 indicates the index sets for the configuration entry D of the configured beam pattern illustrated in FIG. 3.

TABLE 5

| | |
|---|---|
| 0, 0, 0, 0, 0 | 0, 0, 0, 0, 1 |

TABLE 6

| | | | |
|---|---|---|---|
| 0, 0, 0, 0, 0 | 0, 0, 0, 0, 1 | 2, 0, 1, 0, 0 | 2, 0, 1, 0, 1 |
| 0, 0, 2, 0, 0 | 0, 0, 2, 0, 1 | 2, 1, 2, 1, 0 | 2, 1, 2, 1, 1 |
| 0, 1, 0, 1, 0 | 0, 1, 0, 1, 1 | 0, 1, 2, 1, 0 | 0, 1, 2, 1, 1 |
| 0, 0, 0, 1, 0 | 0, 0, 0, 1, 1 | 2, 0, 2, 1, 0 | 2, 0, 2, 1, 1 |

TABLE 7

| | | | |
|---|---|---|---|
| 0, 1, 0, 1, 0 | 0, 1, 0, 1, 1 | 1, 0, 1, 0, 0 | 1, 0, 1, 0, 1 |
| 2, 1, 2, 1, 0 | 2, 1, 2, 1, 1 | 3, 0, 3, 0, 0 | 3, 0, 3, 0, 1 |
| 0, 1, 1, 0, 0 | 0, 1, 1, 0, 1 | 1, 0, 2, 1, 0 | 1, 0, 2, 1, 1 |
| 0, 1, 3, 0, 0 | 0, 1, 3, 0, 1 | 1, 0, 3, 0, 0 | 1, 0, 3, 0, 1 |

TABLE 8

| | | | |
|---|---|---|---|
| 0, 0, 0, 0, 0 | 0, 0, 0, 0, 1 | 1, 0, 1, 0, 0 | 1, 0, 1, 0, 1 |
| 2, 0, 2, 0, 0 | 2, 0, 2, 0, 1 | 3, 0, 3, 0, 0 | 3, 0, 3, 0, 1 |
| 0, 0, 2, 0, 0 | 0, 0, 2, 0, 1 | 1, 0, 2, 0, 0 | 1, 0, 2, 0, 1 |
| 0, 0, 3, 0, 0 | 0, 0, 3, 0, 1 | 1, 0, 3, 0, 0 | 1, 0, 3, 0, 1 |

In the embodiment of the present invention, further, configuration may be performed via the above-described configuration entry to determine a codebook subset corresponding to this configuration entry from the above-described master codebook. The configured beam patterns corresponding to the plurality of configuration entries partially overlap.

For example, in the configured beam pattern illustrated in FIG. 2, for the configuration entry C, the beams (0, 1) and (1, 1) indicated by the independent data-stream beam pattern corresponding to the configuration entry C overlap the beams indicated by the independent data-stream beam pattern corresponding to the configuration entry B. The beams (2, 0) and (3, 0) indicated by the independent data-stream beam pattern corresponding to the configuration entry C overlap the beams indicated by the independent data-stream beam pattern corresponding to the configuration entry D. The independent data-stream beam patterns for the configuration entries A, B, and D also overlap the independent data-stream beam patterns of the other configuration entries.

Further, for example, in the configured beam pattern illustrated in FIG. 3, for the configuration entry C, the beams (0, 1) and (2, 1) indicated by the independent data-stream beam pattern corresponding to the configuration entry C overlap the beams indicated by the independent data-stream beam pattern corresponding to the configuration entry B. The beams (1, 0) and (3, 0) indicated by the independent data-stream beam pattern corresponding to the configuration entry C overlap the beams indicated by the independent data-stream beam pattern corresponding to the configuration entry D. The independent data-stream beam patterns for the configuration entries A, B, and D also overlap the independent data-stream beam patterns of the other configuration entries.

The candidate multiple-data-stream beam entries corresponding to the plurality of configuration entries partially overlap. For example, in the candidate multiple-data-stream beam entries generated for the configured beam pattern illustrated in FIG. 3, the candidate multiple-data-stream beam entry (0, 1, 0, 1) corresponding to the configuration entry C overlaps the candidate multiple-data-stream beam entry corresponding to the configuration entry B. The candidate multiple-data-stream beam entry (1, 0, 1, 0) corresponding to the configuration entry C overlaps the candidate multiple-data-stream beam entry corresponding to the configuration entry D. The candidate multiple-data-stream beam entries for the configuration entries A, B, and D also overlap the candidate multiple-data-stream beam entries of the other configuration entries.

Furthermore, the index sets corresponding to the plurality of configuration entries partially overlap. Specifically, for the configured beam pattern illustrated in FIG. 3, the index sets of the configuration entry A indicated in Table 5, the index sets of the configuration entry B indicated in Table 6, and the index sets of the configuration entry D indicated in Table 8 all include the index set (0, 0, 0, 0, 0). Further, for example, the index sets of the configuration entry B indicated in Table 6 and the index sets of the configuration entry C indicated in Table 7 both include the index set (0, 1, 0, 1, 0). Further, for example, the index sets of the configuration entry C indicated in Table 7 and the index sets of the configuration entry D indicated in Table 8 both include the index set (1, 0, 1, 0, 0).

In the embodiment of the present invention, a basis for generating this configuration entry is the determined candidate multiple-data-stream beam entries. Accordingly, as described above, when the candidate multiple-data-stream beam entries selected based on different predetermined conditions are different, at least one index set for this configuration entry, which is generated based on all the candidate multiple-data-stream beam entries for this configuration entry is also different.

After generating the index set of each configuration entry, the configuration-entry codebook corresponding to the index set can be generated.

In the embodiment of the present invention, after generating the index set for each configuration entry, further, the index sets of the respective configuration entries may be combined to generate the index set for the codeword set in the master codebook, including the index sets for the respective configuration entries.

Table 9 indicates the index sets of the codeword set in the master codebook, in the exemplary configured beam pattern illustrated in FIG. 2. As described above, when generating the index sets for each configuration entry, the candidate multiple-data-stream beam entries of the respective configuration entries are overlapped one another. Therefore, the count of the index sets of the codeword set in the master codebook is smaller than the total count of the index sets for the configuration entry A, the configuration entry B, the configuration entry C, and the configuration entry D. In FIG. 2, the counts of the index sets for the configuration entry A, the configuration entry B, the configuration entry C, and the configuration entry D are, in sequence, two, 16, 16, and 16, and the total is 50. However, because of superimposition, in Table 9, the count of the index sets of the codeword set in the master codebook including the index sets for the configuration entry A, the configuration entry B, the configuration entry C, and the configuration entry D is 32.

TABLE 9

| | | | |
|---|---|---|---|
| 0, 0, 0, 0, 0 | 0, 0, 0, 0, 1 | 1, 0, 1, 0, 0 | 1, 0, 1, 0, 1 |
| 2, 0, 2, 0, 0 | 2, 0, 2, 0, 1 | 3, 0, 3, 0, 0 | 3, 0, 3, 0, 1 |
| 0, 0, 1, 0, 0 | 0, 0, 1, 0, 1 | 1, 0, 2, 0, 0 | 1, 0, 2, 0, 1 |
| 0, 0, 3, 0, 0 | 0, 0, 3, 0, 1 | 1, 0, 3, 0, 0 | 1, 0, 3, 0, 1 |
| 0, 1, 0, 1, 0 | 0, 1, 0, 1, 1 | 1, 1, 1, 1, 0 | 1, 1, 1, 1, 1 |
| 0, 1, 3, 0, 0 | 0, 1, 3, 0, 1 | 0, 1, 1, 1, 0 | 0, 1, 1, 1, 1 |
| 1, 1, 2, 0, 0 | 1, 1, 2, 0, 1 | 1, 1, 3, 0, 0 | 1, 1, 3, 0, 1 |
| 0, 0, 0, 1, 0 | 0, 0, 0, 1, 1 | 1, 0, 1, 1, 0 | 1, 0, 1, 1, 1 |

Table 10 indicates the index sets of the codeword set in the master codebook, in the exemplary configured beam pattern illustrated in FIG. 3. Similar to the example in FIG. 2 and Table 9, the count of the index sets of the codeword set in the master codebook is smaller than the total count of the index sets for the configuration entry A, the configuration entry B, the configuration entry C, and the configuration entry D.

TABLE 10

| | | | |
|---|---|---|---|
| 0, 0, 0, 0, 0 | 0, 0, 0, 0, 1 | 1, 0, 1, 0, 0 | 1, 0, 1, 0, 1 |
| 2, 0, 2, 0, 0 | 2, 0, 2, 0, 1 | 3, 0, 3, 0, 0 | 3, 0, 3, 0, 1 |
| 0, 0, 2, 0, 0 | 0, 0, 2, 0, 1 | 1, 0, 2, 0, 0 | 1, 0, 2, 0, 1 |
| 0, 0, 3, 0, 0 | 0, 0, 3, 0, 1 | 1, 0, 3, 0, 0 | 1, 0, 3, 0, 1 |
| 0, 1, 0, 1, 0 | 0, 1, 0, 1, 1 | 2, 1, 2, 1, 0 | 2, 1, 2, 1, 1 |
| 0, 1, 3, 0, 0 | 0, 1, 3, 0, 1 | 0, 1, 2, 1, 0 | 0, 1, 2, 1, 1 |
| 1, 0, 2, 1, 0 | 1, 0, 2, 1, 1 | 1, 0, 3, 0, 0 | 1, 0, 3, 0, 1 |
| 0, 0, 0, 1, 0 | 0, 0, 0, 1, 1 | 2, 0, 2, 1, 0 | 2, 0, 2, 1, 1 |

In the embodiment of the present invention, for example, the codeword used in data transmission is determined by Equation 1.

Equation 1

$$W^{(2)}_{m_1,m_2,m'_1,m'_2,n} = \frac{1}{\sqrt{2Q}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix} \quad (1)$$

Here, W represents the codeword, $m_1$ represents the absolute index of the horizontal beam of the first data stream, $m_2$ represents the absolute index of the vertical beam of the first data stream, $m_1'$ represents the absolute index of the horizontal beam of the second data stream, $m_2'$ represents the absolute index of the vertical beam of the second data stream, and n represents the index of the polarization-direction beam. And, v represents the horizontal beam, for example, a DFT vector, u represents the vertical beam, for example, a DFT vector, ψ represents the polarization-direction beam, for example, a DFT vector, and Q represents an antenna total number.

Specifically, based on the indexes $i_{1,1}$ and $i_{1,2}$ of the codeword set in the master codebook and the index sets in the codeword set in this master codebook, the codewords included in the codeword set in this master codebook can be determined. The indexes $i_{1,1}$ and $i_{1,2}$ of the codeword set in the master codebook may be notified from the transmitting side to the receiving side, may be fed back from the receiving side to the transmitting side, and $i_{1,1}$ and $i_{1,2}$ each may be the index of the codeword set in the master codebook in a different direction. For example, $i_{1,1}$ may be a horizontal index of the codeword set in the master codebook, and $i_{1,2}$ may be a vertical index of the codeword set in the master codebook.

For example, based on above-described Equation 1, as illustrated in Table 11, the codewords included in the codeword set in the master codebook can be determined. Equations indicated in Table 11 indicate a case applied to the configured beam pattern as illustrated in FIG. 2. That is, the index sets in Table 11 and Table 9 are corresponding to one another.

In the following table, $i_2'$ represents an order number of the codewords in the master codebook, $p_1$ represents an index interval of adjacent beams in the horizontal direction, $p_2$ represents an index interval of adjacent beams in the vertical direction, $s_1$ represents an index interval of adjacent codeword sets in the horizontal direction, and $s_2$ represents an index interval of adjacent codeword sets in the vertical direction. In the description according to the embodiment of the present invention, the horizontal direction and the vertical direction may be interchanged one another. Accordingly, the parameter such as the index for the horizontal direction and the parameter such as the index for the vertical direction may be interchanged one another.

TABLE 11

| $i_2'$ | 0 | 1 |
|---|---|---|
| $i_{1,1}, i_{1,2}$ | $W^{(2)}_{s_1 i_{1,1}, s_2 i_{1,2}, s_1 i_{1,1}, s_2 i_{1,2}, 0}$ | $W^{(2)}_{s_1 i_{1,1}, s_2 i_{1,2}, s_1 i_{1,1}, s_2 i_{1,2}, 1}$ |
| $i_2'$ | 2 | 3 |
| $i_{1,1}, i_{1,2}$ | $W^{(2)}_{s_1 i_{1,1}+2p_1, s_2 i_{1,2}, s_1 i_{1,1}+2p_1, s_2 i_{1,2}, 0}$ | $W^{(2)}_{s_1 i_{1,1}+2p_1, s_2 i_{1,2}, s_1 i_{1,1}+2p_1, s_2 i_{1,2}, 1}$ |
| $i_2'$ | 4 | 5 |
| $i_{1,1}, i_{1,2}$ | $W^{(2)}_{s_1 i_{1,1}+p_1, s_2 i_{1,2}, s_1 i_{1,1}+p_1, s_2 i_{1,2}, 0}$ | $W^{(2)}_{s_1 i_{1,1}+p_1, s_2 i_{1,2}, s_1 i_{1,1}+p_1, s_2 i_{1,2}, 1}$ |
| $i_2'$ | 6 | 7 |
| $i_{1,1}, i_{1,2}$ | $W^{(2)}_{s_1 i_{1,1}+3p_1, s_2 i_{1,2}, s_1 i_{1,1}+3p_1, s_2 i_{1,2}, 0}$ | $W^{(2)}_{s_1 i_{1,1}+3p_1, s_2 i_{1,2}, s_1 i_{1,1}+3p_1, s_2 i_{1,2}, 1}$ |
| $i_2'$ | 8 | 9 |
| $i_{1,1}, i_{1,2}$ | $W^{(2)}_{s_1 i_{1,1}, s_2 i_{1,2}, s_1 i_{1,1}+p_1, s_2 i_{1,2}, 0}$ | $W^{(2)}_{s_1 i_{1,1}, s_2 i_{1,2}, s_1 i_{1,1}+p_1, s_2 i_{1,2}, 1}$ |
| $i_2'$ | 10 | 11 |
| $i_{1,1}, i_{1,2}$ | $W^{(2)}_{s_1 i_{1,1}+p_1, s_2 i_{1,2}, s_1 i_{1,1}+2p_1, s_2 i_{1,2}, 0}$ | $W^{(2)}_{s_1 i_{1,1}+p_1, s_2 i_{1,2}, s_1 i_{1,1}+2p_1, s_2 i_{1,2}, 1}$ |
| $i_2'$ | 12 | 13 |
| $i_{1,1}, i_{1,2}$ | $W^{(2)}_{s_1 i_{1,1}, s_2 i_{1,2}, s_1 i_{1,1}+3p_1, s_2 i_{1,2}, 0}$ | $W^{(2)}_{s_1 i_{1,1}, s_2 i_{1,2}, s_1 i_{1,1}+3p_1, s_2 i_{1,2}, 1}$ |
| $i_2'$ | 14 | 15 |
| $i_{1,1}, i_{1,2}$ | $W^{(2)}_{s_1 i_{1,1}+p_1, s_2 i_{1,2}, s_1 i_{1,1}+3p_1, s_2 i_{1,2}, 0}$ | $W^{(2)}_{s_1 i_{1,1}+p_1, s_2 i_{1,2}, s_1 i_{1,1}+3p_1, s_2 i_{1,2}, 1}$ |
| $i_2'$ | 16 | 17 |
| $i_{1,1}, i_{1,2}$ | $W^{(2)}_{s_1 i_{1,1}, s_2 i_{1,2}+p_2, s_1 i_{1,1}, s_2 i_{1,2}+p_2, 0}$ | $W^{(2)}_{s_1 i_{1,1}, s_2 i_{1,2}+p_2, s_1 i_{1,1}, s_2 i_{1,2}+p_2, 1}$ |

TABLE 11-continued

| $i'_2$ | 18 | 19 |
|---|---|---|
| $i_{1,1}, i_{1,2}$ | $W^{(2)}_{s_1 i_{1,1}+p_1, s_2 i_{1,2}+p_2, s_1 i_{1,1}+p_1, s_2 i_{1,2}+p_2, 0}$ | $W^{(2)}_{s_1 i_{1,1}+p_1, s_2 i_{1,2}+p_2, s_1 i_{1,1}+p_1, s_2 i_{1,2}+p_2, 1}$ |
| $i'_2$ | 20 | 21 |
| $i_{1,1}, i_{1,2}$ | $W^{(2)}_{s_1 i_{1,1}, s_2 i_{1,2}+p_2, s_1 i_{1,1}+3p_1, s_2 i_{1,2}, 0}$ | $W^{(2)}_{s_1 i_{1,1}, s_2 i_{1,2}+p_2, s_1 i_{1,1}+3p_1, s_2 i_{1,2}, 1}$ |
| $i'_2$ | 22 | 23 |
| $i_{1,1}, i_{1,2}$ | $W^{(2)}_{s_1 i_{1,1}, s_2 i_{1,2}+p_2, s_1 i_{1,1}+p_1, s_2 i_{1,2}+p_2, 0}$ | $W^{(2)}_{s_1 i_{1,1}, s_2 i_{1,2}+p_2, s_1 i_{1,1}+p_1, s_2 i_{1,2}+p_2, 1}$ |
| $i'_2$ | 24 | 25 |
| $i_{1,1}, i_{1,2}$ | $W^{(2)}_{s_1 i_{1,1}+p_1, s_2 i_{1,2}+p_2, s_1 i_{1,1}+2p_1, s_2 i_{1,2}, 0}$ | $W^{(2)}_{s_1 i_{1,1}+p_1, s_2 i_{1,2}+p_2, s_1 i_{1,1}+2p_1, s_2 i_{1,2}, 1}$ |
| $i'_2$ | 26 | 27 |
| $i_{1,1}, i_{1,2}$ | $W^{(2)}_{s_1 i_{1,1}+p_1, s_2 i_{1,2}+p_2, s_1 i_{1,1}+3p_1, s_2 i_{1,2}, 0}$ | $W^{(2)}_{s_1 i_{1,1}+p_1, s_2 i_{1,2}+p_2, s_1 i_{1,1}+3p_1, s_2 i_{1,2}+p_2, 1}$ |
| $i'_2$ | 28 | 29 |
| $i_{1,1}, i_{1,2}$ | $W^{(2)}_{s_1 i_{1,1}, s_2 i_{1,2}, s_1 i_{1,1}, s_2 i_{1,2}+p_2, 0}$ | $W^{(2)}_{s_1 i_{1,1}, s_2 i_{1,2}, s_1 i_{1,1}, s_2 i_{1,2}+p_2, 1}$ |
| $i'_2$ | 30 | 31 |
| $i_{1,1}, i_{1,2}$ | $W^{(2)}_{s_1 i_{1,1}+p_1, s_2 i_{1,2}, s_1 i_{1,1}+p_1, s_2 i_{1,2}+p_2, 0}$ | $W^{(2)}_{s_1 i_{1,1}+p_1, s_2 i_{1,2}, s_1 i_{1,1}+p_1, s_2 i_{1,2}+p_2, 1}$ |

Here, the absolute indexes of the codeword can be represented by following Equation 2.

Equation 2

$$m_1 = s_1 i_{1,1} + x1 * p_1;$$
$$m_2 = s_2 i_{1,2} + y1 * p_2;$$
$$m_1' = s_1 i_{1,1} + x2 * p_1;$$
$$m_2' = s_2 i_{1,2} + y2 * p_2. \quad (2)$$

This determines the absolute indexes of each codeword based on the relative indexes as indicated in Table 9.

For the configured beam pattern illustrated in FIG. 2, in the case of the configuration entry A, $s_1=1$, and $s_2=1$, and in the cases of the configuration entries B, C, and D, $s_1=2$, and $s_2=2$.

Here, $p_1=1$, and $p_2=1$.

For example, based on above-described Equation 1, as illustrated in Table 12, the codewords included in the master codebook can be determined. Equations indicated in Table 12 indicate a case applied to the configured beam pattern illustrated in FIG. 3. That is, the index sets in Table 12 and Table 10 are corresponding to one another.

Here, meanings of signs in the equations in Table 12 are similar to those in Table 11. Accordingly, here, overlapping description will be omitted.

TABLE 12

| $i'_2$ | 0 | 1 |
|---|---|---|
| $i_{1,1}, i_{1,2}$ | $W^{(2)}_{s_1 i_{1,1}, s_2 i_{1,2}, s_1 i_{1,1}, s_2 i_{1,2}, 0}$ | $W^{(2)}_{s_1 i_{1,1}, s_2 i_{1,2}, s_1 i_{1,1}, s_2 i_{1,2}, 1}$ |
| $i'_2$ | 2 | 3 |
| $i_{1,1}, i_{1,2}$ | $W^{(2)}_{s_1 i_{1,1}+p_1, s_2 i_{1,2}, s_1 i_{1,1}+p_1, s_2 i_{1,2}, 0}$ | $W^{(2)}_{s_1 i_{1,1}+p_1, s_2 i_{1,2}, s_1 i_{1,1}+p_1, s_2 i_{1,2}, 1}$ |
| $i'_2$ | 4 | 5 |
| $i_{1,1}, i_{1,2}$ | $W^{(2)}_{s_1 i_{1,1}+2p_1, s_2 i_{1,2}, s_1 i_{1,1}+2p_1, s_2 i_{1,2}, 0}$ | $W^{(2)}_{s_1 i_{1,1}+2p_1, s_2 i_{1,2}, s_1 i_{1,1}+2p_1, s_2 i_{1,2}, 1}$ |
| $i'_2$ | 6 | 7 |
| $i_{1,1}, i_{1,2}$ | $W^{(2)}_{s_1 i_{1,1}+3p_1, s_2 i_{1,2}, s_1 i_{1,1}+3p_1, s_2 i_{1,2}, 0}$ | $W^{(2)}_{s_1 i_{1,1}+3p_1, s_2 i_{1,2}, s_1 i_{1,1}+3p_1, s_2 i_{1,2}, 1}$ |
| $i'_2$ | 8 | 9 |
| $i_{1,1}, i_{1,2}$ | $W^{(2)}_{s_1 i_{1,1}, s_2 i_{1,2}, s_1 i_{1,1}+2p_1, s_2 i_{1,2}, 0}$ | $W^{(2)}_{s_1 i_{1,1}, s_2 i_{1,2}, s_1 i_{1,1}+2p_1, s_2 i_{1,2}, 1}$ |
| $i'_2$ | 10 | 11 |
| $i_{1,1}, i_{1,2}$ | $W^{(2)}_{s_1 i_{1,1}+p_1, s_2 i_{1,2}, s_1 i_{1,1}+2p_1, s_2 i_{1,2}, 0}$ | $W^{(2)}_{s_1 i_{1,1}+p_1, s_2 i_{1,2}, s_1 i_{1,1}+2p_1, s_2 i_{1,2}, 1}$ |
| $i'_2$ | 12 | 13 |
| $i_{1,1}, i_{1,2}$ | $W^{(2)}_{s_1 i_{1,1}, s_2 i_{1,2}, s_1 i_{1,1}+3p_1, s_2 i_{1,2}, 0}$ | $W^{(2)}_{s_1 i_{1,1}, s_2 i_{1,2}, s_1 i_{1,1}+3p_1, s_2 i_{1,2}, 1}$ |

TABLE 12-continued

| $i'_2$ | 14 | 15 |
|---|---|---|
| $i_{1,1}, i_{1,2}$ | $W^{(2)}_{s_1i_{1,1}+p_1,s_2i_{1,2},s_1i_{1,1}+3p_1,s_2i_{1,2},0}$ | $W^{(2)}_{s_1i_{1,1}+p_1,s_2i_{1,2},s_1i_{1,1}+3p_1,s_2i_{1,2},1}$ |
| $i'_2$ | 16 | 17 |
| $i_{1,1}, i_{1,2}$ | $W^{(2)}_{s_1i_{1,1},s_2i_{1,2}+p_2,s_1i_{1,1},s_2i_{1,2}+p_2,0}$ | $W^{(2)}_{s_1i_{1,1},s_2i_{1,2}+p_2,s_1i_{1,1},s_2i_{1,2}+p_2,1}$ |
| $i'_2$ | 18 | 19 |
| $i_{1,1}, i_{1,2}$ | $W^{(2)}_{s_1i_{1,1}+2p_1,s_2i_{1,2}+p_2,s_1i_{1,1}+2p_1,s_2i_{1,2}+p_2,0}$ | $W^{(2)}_{s_1i_{1,1}+2p_1,s_2i_{1,2}+p_2,s_1i_{1,1}+2p_1,s_2i_{1,2}+p_2,1}$ |
| $i'_2$ | 20 | 21 |
| $i_{1,1}, i_{1,2}$ | $W^{(2)}_{s_1i_{1,1},s_2i_{1,2}+p_2,s_1i_{1,1}+3p_1,s_2i_{1,2},0}$ | $W^{(2)}_{s_1i_{1,1},s_2i_{1,2}+p_2,s_1i_{1,1}+3p_1,s_2i_{1,2},1}$ |
| $i'_2$ | 22 | 23 |
| $i_{1,1}, i_{1,2}$ | $W^{(2)}_{s_1i_{1,1},s_2i_{1,2}+p_2,s_1i_{1,1}+2p_1,s_2i_{1,2}+p_2,0}$ | $W^{(2)}_{s_1i_{1,1},s_2i_{1,2}+p_2,s_1i_{1,1}+2p_1,s_2i_{1,2}+p_2,1}$ |
| $i'_2$ | 24 | 25 |
| $i_{1,1}, i_{1,2}$ | $W^{(2)}_{s_1i_{1,1}+p_1,s_2i_{1,2},s_1i_{1,1}+2p_1,s_2i_{1,2}+p_2,0}$ | $W^{(2)}_{s_1i_{1,1}+p_1,s_2i_{1,2},s_1i_{1,1}+2p_1,s_2i_{1,2}+p_2,1}$ |
| $i'_2$ | 26 | 27 |
| $i_{1,1}, i_{1,2}$ | $W^{(2)}_{s_1i_{1,1}+p_1,s_2i_{1,2},s_1i_{1,1}+3p_1,s_2i_{1,2},0}$ | $W^{(2)}_{s_1i_{1,1}+p_1,s_2i_{1,2},s_1i_{1,1}+3p_1,s_2i_{1,2},1}$ |
| $i'_2$ | 28 | 29 |
| $i_{1,1}, i_{1,2}$ | $W^{(2)}_{s_1i_{1,1},s_2i_{1,2},s_1i_{1,1},s_2i_{1,2}+p_2,0}$ | $W^{(2)}_{s_1i_{1,1},s_2i_{1,2},s_1i_{1,1},s_2i_{1,2}+p_2,1}$ |
| $i'_2$ | 30 | 31 |
| $i_{1,1}, i_{1,2}$ | $W^{(2)}_{s_1i_{1,1}+2p_1,s_2i_{1,2},s_1i_{1,1}+2p_1,s_2i_{1,2}+p_2,0}$ | $W^{(2)}_{s_1i_{1,1}+2p_1,s_2i_{1,2},s_1i_{1,1}+2p_1,s_2i_{1,2}+p_2,1}$ |

In the codebooks indicated in Table 11 and Table 12, so as to correspond to the index sets indicated in Table 9 and Table 10 respectively, an order number $i_2'$ of each codeword is configured. However, the order of the respective codewords in the master codebook is not limited to aspects indicated in Table 11 and Table 12, and it is only necessary to match order numbers $i_2'$ of the codewords in the master codebook and the index sets of each codeword.

In the above-described description for the method that generates the configuration-entry codebook, the case where the data signal is transmitted in the two data streams has been described as an example. However, the method may be applicable for a case where the data signal is transmitted in more data streams. The count of the configuration entries is not limited to four. Other count of configuration entries may be disposed. The configured beam pattern for each configuration entry is not limited to the configured beam patterns exemplified in FIG. 2 and FIG. 3, and may be determined as another configured beam pattern.

The above-described working example of the present invention provides the method that generates the configuration entry in the master codebook when performing the radio communication using the multiple data stream. In the generating method of the configuration entry according to the working example of the present invention, the configuration entry in the master codebook is formed using fewer beams. Accordingly, a subsequent operation required for the mobile station can be simplified.

Figure 4:
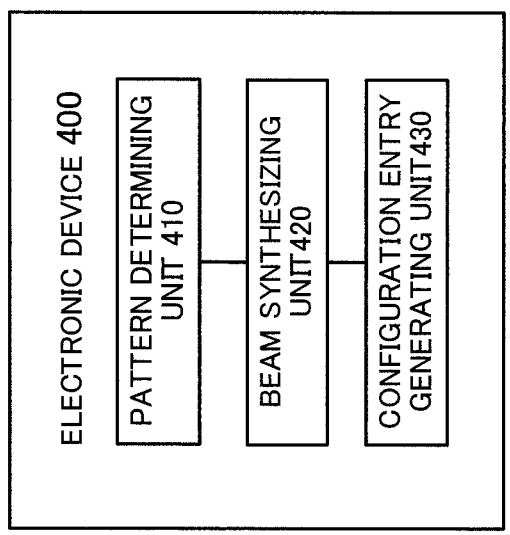
FIG. 4 is a functional block diagram illustrating an electronic device according to the embodiment of the present invention.

The following describes an electronic device 400 according to the embodiment of the present invention with reference to FIG. 4. An electronic device according to the embodiment of the present invention, which is used for performing the above-described method that generates the configuration entry in the master codebook, is, for example, the base station and the mobile station.

FIG. 4 is a functional block diagram illustrating the electronic device 400 according to the embodiment of the present invention. The electronic device 400 according to the embodiment of the present invention includes a pattern determining unit 410, a beam synthesizing unit 420, and a configuration entry generating unit 430. Other than these three means, the electronic device 400 may further include other means, for example, means that perform various processes with respect to the data signal or a control signal. However, these means have no relationship to the content of the working example of the invention. Thus, here, their illustration and description will be omitted. The detail of the following operation that the electronic device 400 according to the working example of the present invention performs is similar to the detail described in the above with reference to FIGS. 1 to 3. Therefore, here, in order to avoid overlapping, the similar overlapped description for the detail will be omitted.

The pattern determining unit 410 determines the configured beam pattern corresponding to each of the plurality of configuration entries in the master codebook in the case of the multiple-data-stream transmission. Here, the beam pattern indicates the beam that the mobile station can use in the beam set. In the case of the multiple-data-stream transmission, the configured beam pattern corresponding to each configuration entry includes the plurality of independent data-stream beam patterns. The count of the independent data-stream beam pattern is identical to the count of the transmission data streams. For example, when transmitting the data signal in two data streams, the configured beam pattern corresponding to each configuration entry includes two independent data-stream beam patterns (that is, the first data-stream beam pattern and the second data-stream beam pattern).

For the master codebook, for example, four configuration entries (the configuration entry A, the configuration entry B, the configuration entry C, and the configuration entry D) may be disposed. The count of the configuration entries may be other counts. For each configuration entry, the plurality of independent data-stream beam patterns corresponding to this configuration entry are similar. Specifically, as illustrated in FIG. 2 and FIG. 3, for the configuration entry A, the first data-stream beam pattern is similar to the second data-stream beam pattern, and for the configuration entry B, the first data-stream beam pattern is similar to the second data-stream beam pattern. Also for the configuration entry C and the configuration entry D, similarly, the first data-stream beam pattern is similar to the second data-stream beam pattern.

In the embodiment of the present invention, a plurality of configuration entries may include the first configuration entry and a plurality of second configuration entries other than the first configuration entry. The beam indicated by the independent data-stream beam pattern corresponding to the first configuration entry may include the beam that does not overlap the beams indicated by the independent data-stream beam patterns of the different second configuration entries. In the one example of the present invention, the count of the beam indicated by the independent data-stream beam pattern corresponding to each second configuration entry is identical to the count of the beam indicated by the independent data-stream beam pattern corresponding to the first configuration entry.

For example, in the configured beam pattern illustrated in FIG. 2, the beams indicated by the independent data-stream beam pattern corresponding to the configuration entry C include the beams that do not overlap the beams indicated by the independent data-stream beam patterns of the different second configuration entries (that is, the configuration entry B and the configuration entry D). In this configured beam pattern, the count of the beams indicated by the independent data-stream beam pattern corresponding to the configuration entry C is identical to that of the beams indicated by the independent data-stream beam pattern corresponding to each of the configuration entries B and D. As illustrated in FIG. 2, the beams that overlap one another among the beams indicated by the independent data-stream beam patterns of the different second configuration entries B and D are (0, 0) and (1, 0). The beams indicated by the independent data-stream beam pattern corresponding to the configuration entry C are (0, 1), (1, 1), (2, 0), and (3, 0), thus, do not include these overlapped beams (0, 0) and (1, 0).

Similar to FIG. 2, FIG. 3 also illustrates configured the beam patterns including four configuration entries (that is, the configuration entry A, the configuration entry B, the configuration entry C, and the configuration entry D) in the indicated configured beam patterns. Here, for the configuration entry C, the beams indicated by the independent data-stream beam pattern corresponding to the configuration entry C include the beams that do not overlap the beams indicated by the independent data-stream beam patterns of the different second configuration entries (the configuration entry B and the configuration entry D). In this configured beam pattern, the count of the beams indicated by the independent data-stream beam pattern corresponding to the configuration entry C is identical to that of the beams indicated by the independent data-stream beam pattern corresponding to each of the configuration entries B and D. For example, the beams that overlap one another among the beams indicated by the independent data-stream beam patterns of the different second configuration entries (the configuration entries B and the configuration entry D) are (0, 0) and (2, 0). The beams indicated by the independent data-stream beam pattern corresponding to the configuration entry C are (0, 1), (1, 0), (2, 1), and (3, 0), thus, do not include these overlapped beams (0, 0) and (2, 0).

In the embodiment of the present invention, the beams indicated by the independent data-stream beam pattern of the first configuration entry may not be adjacent in the first direction and/or the second direction.

Specifically, in the configured beam pattern illustrated in FIG. 3, the independent data-stream beam pattern for the configuration entry C indicates the beams (0, 1), (1, 0), (2, 1), and (3, 0). In the indicated four beams, the beams whose relative index of the horizontal beam are identical do not exist. That is, the beams indicated by the independent data-stream beam pattern for the configuration entry C are not adjacent in the vertical direction. According to the grids filling up with the diagonal lines illustrated in FIG. 3 (representing the beams that the mobile station can use in this data stream), the grids filling up with the diagonal lines are not adjacent to one another even in the horizontal direction.

Referring again to FIG. 4, the beam synthesizing unit 420 synthesizes the beams indicated by the plurality of independent data-stream beam patterns corresponding to each configuration entry to form a plurality of multiple-data-stream beam entries for this configuration entry. Specifically, when generating the data-stream beam entry for the configuration entry, each one beam is selected from the beams indicated by the plurality of independent data-stream beam patterns corresponding to this configuration entry. The respective selected beams are synthesized to constitute the multiple-data-stream beam entry for this configuration entry.

For example, in the case of the configured beam pattern illustrated in FIG. 2, for the configuration entry A, one beam (0, 0) is selected from the beams indicated by the first data-stream beam pattern, and one beam (0, 0) is selected from the beams indicated by the second data-stream beam pattern. Accordingly, the multiple-data-stream beam entry (0, 0, 0, 0) for the configuration entry A is constituted. For the configuration entry B, for example, one beam (0, 0) is selected from the beams indicated by the first data-stream beam pattern, and one beam (0, 0) is selected from the beams indicated by the second data-stream beam pattern. Accordingly, the multiple-data-stream beam entry (0, 0, 0, 0) for the configuration entry B is constituted. For example, one beam (0, 0) is selected from the beams indicated by the first data-stream beam pattern, and one beam (1, 0) is selected from the beams indicated by the second data-stream beam pattern. Accordingly, the multiple-data-stream beam entry (0, 0, 1, 0) for the configuration entry B is constituted. Thus, for the configuration entry B, the first data-stream beam pattern indicates four available beams, and the second data-stream beam pattern indicates four available beams. Accordingly, 16 (=4×4) multiple-data-stream beam entries for the configuration entry B can be constituted. Similarly, also for the configuration entry C and the configuration entry D, 16 (=4×4) multiple-data-stream beam entries each for the configuration entry C and the configuration entry D can be constituted.

The configuration entry generating unit 430 determines a part of multiple-data-stream beam entries that fulfill the predetermined condition from the plurality of multiple-data-stream beam entries formed for each configuration entry, as the candidate multiple-data-stream beam entries. Specifically, when determining a part of multiple-data-stream beam entries from the plurality of multiple-data-stream beam entries formed for each configuration entry, the beam of the first data stream and the beam of the second data stream in a part of multiple-data-stream beam entries to be selected relate to one another. Accordingly, the transmission efficiency can be improved. For example, in the multiple-data-stream beam entries that can be constituted for the configuration entry C, for the beam entry (0, 1, 2, 0), the beam of the first data stream is (0, 1), and the beam of the second data stream is (2, 0). The beam of the first data stream and the beam of the second data stream are poor in relevance. Thus, the beam entry (0, 1, 2, 0) is not selected as the candidate multiple-data-stream beam entry.

In the embodiment of the present invention, when determining a part of multiple-data-stream beam entries from the plurality of multiple-data-stream beam entries formed for each configuration entry, considering the candidate multiple-data-stream beam entries in other configuration entries, the candidate multiple-data-stream beam entries of the respective configuration entries may overlap one another.

Specifically, in the case of the configured beam pattern illustrated in FIG. 2, a part of multiple-data-stream beam entries (0, 1, 0, 1), (0, 1, 1, 1), (0, 1, 3, 0), (1, 1, 1, 1), (1, 1, 2, 0), (1, 1, 3, 0), (2, 0, 2, 0), and (3, 0, 3, 0) are selected for the configuration entry C. Accordingly, the selected eight multiple-data-stream beam entries will be the candidate multiple-data-stream beam entries.

In the embodiment of the present invention, in the master beam set, the count of the beams in the first direction may be identical to the count of the beams in the second direction in the candidate multiple-data-stream beam entries of the first configuration entry. For example, as described above, when selecting eight candidate multiple-data-stream beam entries from 16 multiple-data-stream beam entries in accordance with the predetermined condition, in the eight candidate multiple-data-stream beam entries, the count of the beams in the horizontal direction is identical to the count of the beams in the vertical direction.

After determining the candidate multiple-data-stream beam entries, the configuration entry generating unit 430 further, generates this configuration entry based on the determined candidate multiple-data-stream beam entries.

Specifically, after determining the candidate multiple-data-stream beam entries for each configuration entry, at least one index set for this configuration entry is generated based on all the candidate multiple-data-stream beam entries for this configuration entry.

For example, the candidate multiple-data-stream beam entries for this configuration entry may be the index set for this configuration entry. Here, each index set for this configuration entry includes the relative index of the horizontal beam of the first data stream, the relative index of the vertical beam of the first data stream, the relative index of the horizontal beam of the second data stream, and the relative index of the vertical beam of the second data stream.

When generating the index set for this configuration entry based on the candidate multiple-data-stream beam entries of this configuration entry, the index "n" that represents the polarization-direction beam may be added. For example, when values that the added index of the polarization-direction beam take two possible values, for the configuration entry C of the configured beam pattern illustrated in FIG. 2, based on the determined eight candidate multiple-data-stream beam entries (0, 1, 0, 1), (0, 1, 1, 1), (0, 1, 3, 0), (1, 1, 1, 1), (1, 1, 2, 0), (1, 1, 3, 0), (2, 0, 2, 0), and (3, 0, 3, 0), 16 index sets: (x1=0, y1=1, x2=0, y2=1, n=0), (0, 1, 0, 1, 1), (0, 1, 1, 1, 0), (0, 1, 1, 1, 1), (0, 1, 3, 0, 0), (0, 1, 3, 0, 1), (1, 1, 1, 1, 0), (1, 1, 1, 1, 1), (1, 1, 2, 0, 0), (1, 1, 2, 0, 1), (1, 1, 3, 0, 0), (1, 1, 3, 0, 1), (2, 0, 2, 0, 0), (2, 0, 2, 0, 1), (3, 0, 3, 0, 0), and (3, 0, 3, 0, 1) for this configuration entry C are generated.

In the embodiment of the present invention, the configured beam patterns corresponding to the plurality of configuration entries may partially overlap.

For example, in the configured beam pattern illustrated in FIG. 2, for the configuration entry C, the beams (0, 1) and (1, 1) indicated by the independent data-stream beam pattern corresponding to the configuration entry C overlap the beams indicated by the independent data-stream beam pattern corresponding to the configuration entry B. The beams (2, 0) and (3, 0) indicated by the independent data-stream beam pattern corresponding to the configuration entry C overlap the beams indicated by the independent data-stream beam pattern corresponding to the configuration entry D. The independent data-stream beam patterns for the configuration entries A, B, and D also overlap the independent data-stream beam patterns of the other configuration entries.

Further, for example, in the configured beam pattern illustrated in FIG. 3, for the configuration entry C, the beams (0, 1) and (2, 1) indicated by the independent data-stream beam pattern corresponding to the configuration entry C overlap the beams indicated by the independent data-stream beam pattern corresponding to the configuration entry B. The beams (1, 0) and (3, 0) indicated by the independent data-stream beam pattern corresponding to the configuration entry C overlap the beams indicated by the independent data-stream beam pattern corresponding to the configuration entry D. The independent data-stream beam patterns for the configuration entries A, B, and D also overlap the independent data-stream beam patterns of the other configuration entries.

After generating the index set for each configuration entry, the electronic device 400 further, may combine the index sets of the respective configuration entries to generate the index set for the codeword set in the master codebook, including the index sets for the respective configuration entries.

For example, in the above-described example, the master-codebook index set may include the index sets for the configuration entry A, the configuration entry B, the configuration entry C, and the configuration entry D. As described above, when generating the index sets for each configuration entry, the candidate multiple-data-stream beam entries of the respective configuration entries are overlapped one another. Therefore, the count of the index sets in the master codebook is smaller than the total count of the index sets for the configuration entry A, the configuration entry B, the configuration entry C, and the configuration entry D. For example, the counts of the index sets for the configuration entry A, the configuration entry B, the configuration entry C, and the configuration entry D are, in sequence, two, 16, 16, and 16, and the total is 50. However, the count of the index sets in the master codebook including the index sets for the configuration entry A, the configuration entry B, the configuration entry C, and the configuration entry D is 32.

In the above-described description, the case where the electronic device 400 transmits the data signal in the two data streams has been described as an example. However, the method may be applicable for a case where the data signal is transmitted in more data streams. The count of the configuration entries is not limited to four. Other count of configuration entries may be disposed. The configured beam pattern for each configuration entry is not limited to the configured beam patterns exemplified in FIG. 2 and FIG. 3, and may be determined as another configured beam pattern.

The electronic device 400 further may include a codebook generating unit. The codebook generating unit may be configured via the configuration entry to determine the codebook subset corresponding to this configuration entry from the master codebook.

The above-described working example of the present invention provides an electronic device that generates the configuration entry in the master codebook when performing the radio communication using the multiple data stream. The electronic device according to the working example of the present invention forms the configuration entry in the master codebook using fewer beams to simplify a subsequent operation required for the mobile station.

As understood by those skilled in the art, the combination of each means and step described in the embodiment of the present invention can be performed by electric hardware, computer software, or a combination of both. A software module may be stored in any forms of computer storage media. For example, the functions achieved by the pattern determining unit 410, the beam synthesizing unit 420, and the configuration entry generating unit 430 included in the electronic device 400 can be performed through a processor (for example, a CPU).

In order to clearly describe compatibility between the hardware and the software, in the above-described description, each exemplary configuration and step have been already typically described based on the functions. A specific application of technical means of solving and constraint conditions of a design determines whether these functions are achieved by the hardware or achieved by the software. Those skilled in the art can perform the described functions using different methods with respect to various specific application, however, should not consider that such performance exceeds the claims of the present invention.

Each embodiment of the present invention has been described above in detail. However, those skilled in the art should understand that, without departing from the principle and the thought of the present invention, various modifications, combinations, or subcombinations may be performed with respect to these embodiments, and such modifications should fall into the claims of the present invention.

This application is based on Chinese Patent Application No. 201510673152.2 filed on Oct. 18, 2015, and the disclosure of which is incorporated herein.

The invention claimed is:

1. A base station comprising:
   a codebook generating unit that determines a codebook subset corresponding to one configuration entry from a plurality of configuration entries in a master codebook; and
   a transmitter that transmits information of the one configuration entry,
   wherein the plurality of configuration entries comprise four configuration entries,
   a first configuration entry corresponds to a beam pattern in which an available beam is (0, 0),
   a second configuration entry corresponds to a beam pattern in which available beams are (0, 0), (1, 0), (0, 1), (1, 1),
   a third configuration entry corresponds to a beam pattern in which available beams are (0, 1), (1, 1), (2, 0), (3, 0), and
   a fourth configuration entry corresponds to a beam pattern in which available beams are (0, 0), (1, 0), (2, 0), (3, 0),
   where in (x, y), x indicates a relative index in a first direction and y indicates a relative index in a second direction.

2. The base station according to claim 1, further comprising
   a synthesizing unit that synthesizes beams based on the one configuration entry.

3. A mobile station comprising:
   a receiver that receives information of one configuration entry; and
   a codebook generating unit that determines a codebook subset corresponding to the one configuration entry from a plurality of configuration entries in a master codebook,
   wherein the plurality of configuration entries comprise four configuration entries,
   a first configuration entry corresponds to a beam pattern in which an available beam is (0, 0),
   a second configuration entry corresponds to a beam pattern in which available beams are (0, 0), (1, 0), (0, 1), (1, 1),
   a third configuration entry corresponds to a beam pattern in which available beams are (0, 1), (1, 1), (2, 0), (3, 0), and
   a fourth configuration entry corresponds to a beam pattern in which available beams are (0, 0), (1, 0), (2, 0), (3, 0),
   where in (x, y), x indicates a relative index in a first direction and y indicates a relative index in a second direction.

4. A radio communication method comprising:
   determining a codebook subset corresponding to one configuration entry from a plurality of configuration entries in a master codebook; and
   transmitting information of the one configuration entry,
   wherein the plurality of configuration entries comprise four configuration entries,
   a first configuration entry corresponds to a beam pattern in which an available beam is (0, 0),
   a second configuration entry corresponds to a beam pattern in which available beams are (0, 0), (1, 0), (0, 1), (1, 1),
   a third configuration entry corresponds to a beam pattern in which available beams are (0, 1), (1, 1), (2, 0), (3, 0), and
   a fourth configuration entry corresponds to a beam pattern in which available beams are (0, 0), (1, 0), (2, 0), (3, 0),
   where in (x, y), x indicates a relative index in a first direction and y indicates a relative index in a second direction.

* * * * *